United States Patent Office 3,396,402
Patented Aug. 6, 1968

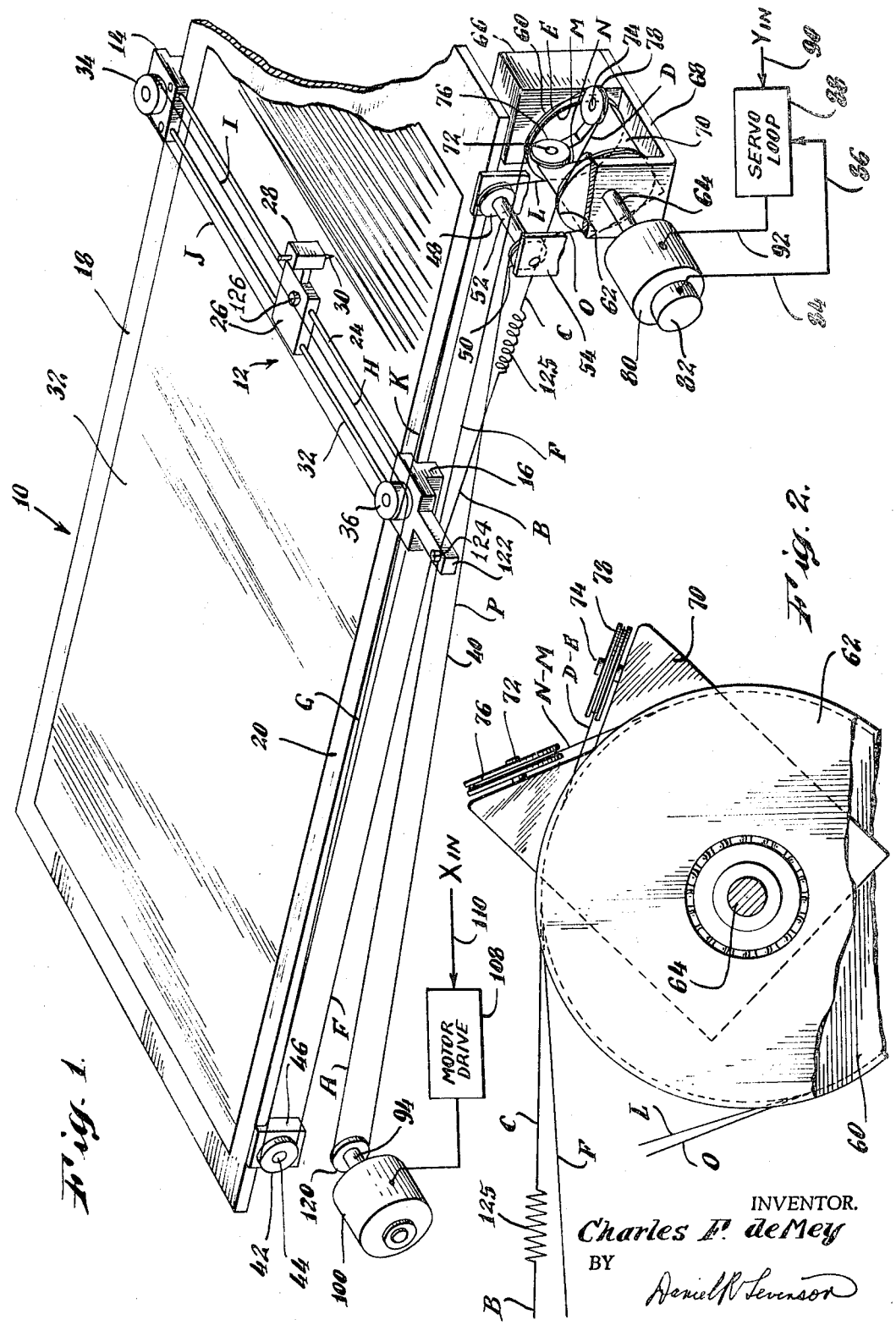

3,396,402
X-Y RECORDER HAVING SINGLE CONTINUOUS CABLE DRIVE SYSTEM
Charles Frederic de Mey II, West Redding, Conn., assignor to The Perkin-Elmer Corporation, Norwalk, Conn., a corporation of New York
Filed Dec. 5, 1966, Ser. No. 598,995
6 Claims. (Cl. 346—29)

ABSTRACT OF THE DISCLOSURE

In one type of chart recorder, a marker element is driven in one co-ordinate direction along a carriage, and the carriage is driven in a different (e.g., perpendicular) direction so as to make a graphical record on the chart. Different parts of a single continuous cable are driven by separate motors, and different points of the cable are attached to the marker and to the carriage. The continuous cable is so arranged about various pulleys that a carriage drive motor moves the cable portion attached to the carriage without causing pen movement; and the pen motor drives the pen portion of the cable through a special pulley-type of differential so as to decouple the pen drive from moving the carriage. In this way, two separate motors independently control the marker and carriage movements, despite the use of a single connecting cable.

---

This invention relates to devices of the type in which an element is moved to any x-y coordinate position on a plane in a controlled manner. One class of such devices includes x-y chart recorders, in which a marking device may be positioned anywhere on a relatively stationary recording chart; in such recorders the marking device is controlled by two imput values (for x and y, respectively).

Although x-y recorders exist, such prior art x-y recorders include relatively complex mechanical and/or electronic parts. Since many of these parts must be of extremely high precision, both the initial manufacturing costs and requiring maintenance tend to be high if the recorder is to produce accurate results. Recorders (or other devices) according to the invention require no great precision in any parts other than simple circular rollers (i.e., pulleys) and simple linear potentiometers, while allowing the positioning control of the element (e.g., the marking device) in a highly precise way as to both its x and y position.

Accordingly the primary object of the invention is to provide an apparatus which may locate and move an element (for example, a marking device) in a completely controlled, highly precise manner any place on an x-y plane of given dimension, which apparatus requires no complicated parts of high precision.

Another object of the invention is the provision of such an apparatus, in which the x coordinate and the y coordinate are substantially independently controlled by means of simple linear inputs, despite the fact that the entire mechanical connection is provided by essentially a single common element (namely, a continuous cable).

Other objects and advantages of the invention will be obvious to one skilled in the art upon reading the following detailed specification in conjunction with the accompanying drawing, in which:

FIG. 1 is a somewhat simplified perspective view of an exemplary embodiment of the inventive apparatus, indicating schematically the simple electrical input circuits; and FIG. 2 is a detail of that part of the pulley arrangement which allows decoupling of the x and y motions of the controllably movable element (marking device).

In FIG. 1, an extensive horizontal frame 10 forms the main supporting frame of the apparatus. In the following description, since the exemplary illustrated embodiment of the invention is a recorder, terms appropriate to such an apparatus will be utilized; it should be understood, however, that the invention is not limited to this particular function, but rather may move any element in a controlled manner over an x-y plane. A carriage (hereinafter in the recorder contex referred to as a marker or pen carriage) 12, extending generally in one direction hereinafter referred to as the y or ordinate direction), is mounted on frame 10 so as to be movable thereupon in the other perpendicular horizontal direction (hereinafter referred to as the x or abscissa direction). Specifically the two ends 14, 16 of carriage 12 may ride on the opposite edges of frame 10, forming tracks 18, 20. The major central portion of pen carriage 12 comprises a pair of parallel rigid bars 22, 24, fixedly attached at both of their ends to the respective blocks 14 and 16. A marker block 26 slidably receives bars 22 and 24 in appropriate horizontal apertures so that marker block 26 is easily movable in the y direction along carriage 12. The marker or pen proper 30 may be connected to pen block 26 in any suitable manner.

The pair of idler pulleys 34, 36 are mounted for rotation on stub shafts rigidly mounted on end blocks 14 and 16 respectively. Another idler pulley 42 is rotatably mounted about a stub shaft 44 rigidly held in block 46 which in turn is rigidly secured to the main frame 10. A pair of idler pulleys 48, 50 are rotatably mounted on a horizontal stub shaft 52 which in turn is supported by a U-shaped bracket 54, which in turn is rigidly attached to frame 10. A final pair of idler pulleys (considerably larger than the other idler pulleys) at 60, 62 are loosely mounted on motor shaft 64, which in turn is rotatably supported in a bearing (not shown) in mounting block 66 and upturned bracket plate 68. Bracket 68 and bracket 54 may be joined.

As may best be seen by comparison of FIGS. 1 and 2, motor shaft 64 is rigidly connected to a generally pentagonal block 70. Block 70 rigidly supports a pair of stub shafts 72, 74, which in turn rotatably support a pair of pulleys 76, 78, respectively. The entire assembly of elements 70–78 performs a function which is at least analogous to that of a differential, as will be explained hereinafter. Motor shaft 64 is connected to the moving element of pen motor 80.

As indicated in the lower right-hand corner of FIG. 1, a simple linear servo loop 88 controls the position of pen motor 80. A linear potentiometer 82, rigidly attached to motor shaft 64, supplies an electrical signal, which is directly proportional to the rotative position of shaft 64, over lead 84 as the feedback or follow signal input 86 to conventional servo circuit 88. The output 92 of circuit 88 (which may be a subtractive amplifier, for example) therefore is a motor-driving signal, proportional to the difference between the Y input signal at 90 and the follow signal at 86 (and therefore between the desired and actual position of shaft 64). Since the rotational position of shaft 64 directly determines the y coordinate of marker 30 (as will be seen hereinafter), the marker will be positioned directly in accordance with the value of the Y input signal at 90.

The x coordinate of marker 30 is determined by motor 100, supplied by motor drive system 108. This may be a steady electrical supply, a variable electrical signal, or even may comprise a servo loop similar to the one just described for the y coordinate (i.e., elements 82–92). If motor drive 108 is intended to have a variable output, its input 110 would be supplied with a signal proportional to the desired x coordinate (as indicated at the X input). In any event motor 100 will drive the carriage 12 (as will be described hereinafter) to determine the $x$ coordinate position of marker 30.

The mechanical connection between the carriage drive motor 100, motor shaft 94 and rigidly connected carriage drive roller 120 and the carriage 12, on the one hand, and between the pen drive and the pen block 26 on the other hand is accomplished by means of a single continuous cable 40. Because the path of this cable is somewhat convoluted and difficult to follow in a drawing, the entire path of the cable will first be described, and reference letters assigned to each consecutive portion of cable 40. Starting somewhat arbitrarily at the upper part of the carriage drive roller 120, the first portion, A, passes over extension 122 of end block 16 of the carriage assembly 12. A screw 124 firmly connects the cable to the carriage 12 so that portion A of the cable and the carriage always move together. After such attachment, the cable continues as portion B, which is connected to one end of a tensioning device, such as a firm spring 12. The firmness of this spring assures that no substantial change in the length of the cable occurs during normal operation. Physically spring 125 connects the two ends (namely, portions B and C) of what is otherwise a continuous cable, thereby making the cable in effect endless.

Portion C extends under idler pulley shaft 52 to the upper edge surface of large idler pulley 62. The next portion, D, of the cable extends from large pulley 62 to the near edge of small angled pulley 78. The extent to which portion D is wrapped around (in the clockwise direction) large pulley 62 will vary with the rotative position of block 70 (which rigidly supports angled small pulley 78). After traveling half way around (in a generally counterclockwise direction) small angled pulley 78, emerging portion E will contact the generally upper side of the edge of the rear large pulley 60. The extent to which portion E is wrapped about large pulley 60 will also be determined by the position of movable angled pulley 78.

Cable portion F extends from the uppermost part of rear large pulley 60, under extension 122 of the carriage 12, all the way to the lower edge of left-hand idler pulley 42. After being wrapped about pulley 42 (in a clockwise direction) continuing portion G extends to the near edge of carriage pulley 36. After being wrapped about pulley 36 for approximately 90° (in a counterclockwise direction, as viewed from the top of pulley 36), continuing portion H is fastened to the sliding pen block 26 as by a screw 126. The next portion, I, of the cable extends from screw 126 to the right-hand edge of the other carriage pulley, 34. After going around the far side of pulley 34 for approximately 180° (in a counterclockwise direction as viewed from the top of the pulley), portion J continues to the left-hand side of carriage pulley 36. After approximately 90° of travel (counterclockwise) around pulley 36, continuing portion K passes over the top of small idler pulley 48. After a 90° wrap (clockwise) around pulley 48, portion L extends generally downward to the left-hand edge of rear large pulley 60. After being wrapped (counterclockwise) about large pulley 60, continuation M passes to the upper edge of angled small pulley 76. The extent to which cable portion M will be wrapped about large pulley 60 will depend upon the existing position of pen drive pulley block 70 (and therefore angled pulley 76). After engaging angled pulley 76 (for approximately 180°), the next portion N meets with and travels about the edge of the front large pulley 62. The point at which cable portion N meets large pulley 62 (and therefore its extent of travel there-around) will also vary depending upon the position of the various pen drive elements (and especially block 70 and pulley 76). After extending (clockwise) about large pulley 62 by such variable amount, the upwardly emerging portion O is trained over the adjacent edge surface of small pulley 50. After about 90° of (counterclockwise) travel about pulley 50, cable portion P extends therefrom back to the lower part of carriage drive roller 120. The left-hand end of this portion P then is wrapped around carriage drive roller 120 (clockwise) so as to join the left-hand end of portion A, thus completing a continuous path.

The manner in which the single continuous cable and the two motors (80, 100) drive the carriage 12 and the pen (26–30), respectively, will now be described. First we shall assume that the pen drive motor 80 is stationary, and the carriage is being driven from right to left. Under such conditions the input signal will drive the motor 100, shaft 98 and carriage drive roller 120 in a counterclockwise direction. This will cause portion A to move to the left, pulling carriage 12 in the same direction. Similarly cable portions B and C will move in the same manner to the left. Because the right-hand end of portion C is in contact with a large pulley 62, this pulley will be rotated in a counterclockwise direction.

To avoid confusion in terminology as to where an entering cable portion ends and the emerging cable portion begins on each encounter with a pulley, portions contacting a pulley will hereinafter be considered as forming parts of both of these cable portions, and will be referred to by hyphenating the two cable portions that are so joined. Thus the part of the cable joining portions C and D that is wrapped around the upper part of large pulley 62 may be termed "C-D." This joining portion C-D (which is quite short for the particular rotational position of block 70 shown) and the next cable portion D will move generally toward the left. This will cause pulley-contacting portion D-E (and of course the pulley 78 itself) to travel in a clockwise direction around the axis of pulley 78, thereby moving cable portion E generally to the right. Cable portion F will therefore also move to the right, with the pulley-contacting portion E-F causing rotation of the rear large pulley 60 in a clockwise direction about its axis. Movement of the long portion F to the right will cause counterclockwise rotation of idler pulley 42, and leftward movement of cable portion G.

This leftward movement of cable portion G would appear to be transmitted around idler pulley 36, so as to cause motion of cable portion H in a direction generally toward the viewer in FIG. 1. Such motion of portion H would cause the pen block 26 (and of course pen 30) to be traversed in this same direction. Actually no such movement of cable portion H will take place under these conditions. The reason that cable portion H does not move is that not only are all of portions A through G of the cable moving at the same linear speed, but also the pen carriage 12 (and therefore pulley 36) is also moving at the same linear speed from right to left. Therefore the tendency for the movement of portion G to pull additional cable around pulley 36 is exactly compensated by the motion of this pulley in the same direction. In other words, the movement of the carriage to the left tends to slacken cable portion G at exactly the same linear rate that this portion is being pulled to the left. Therefore under the assumed conditions, the exact same part of the cable G-H remains wrapped around pulley 36, and pulley 36 does not rotate at all.

It might be noted that as long as the pen motor 80 (and the associated pen drive elements) are stationary, the entire cable is being driven at the same linear speed relative to the fixed frame 10. It is only the orientation of the loop formed by portions H, I and J (and the fact that this loop is moving as a whole) that makes it seem to be stationary; in fact these portions of the cable are moving in space (relative to fixed frame 10) at this same linear speed, although apparently sideways. The portion J-K extends (counterclockwise) around pulley 36 is of course also moving to the left at this same linear speed (relative to fixed frame 10), although stationary relative to the also traversing pulley 36 and its axis. Therefore cable portion K is moving (as indeed all the cable portions are) at the same speed (in this case also to the left). This motion of portion K will cause (counterclockwise)

rotation of idler pulley 48 and generally upward motion of cable portion L. That portion L-M wrapped around rear large pulley 60 will move in a clockwise direction (pulley 60 already being moved in this direction by the previously described wrapped around portion E-F). Therefore the next portion M will move in a direction generally to the right causing clockwise rotation of angled pulley 76, generally upward motion of portion N, and counterclockwise movement of the cable portion N-O wrapped about front large pulley 62. Again large pulley 62 is already being rotated in this direction (and at the same speed of course) by previously described cable portion C-D. Cable portion O will move generally downward, causing clockwise rotation of pulley 50 and right-hand movement of long cable portion P. The final cable portion P-A wrapped around drive roller 120 will travel with the roller in a counterclockwise direction. This completes the entire circuit along the cable for motion of the carriage drive elements, while the pen drive elements are stationary. In a similar manner it is possible to trace the cable motions in the opposite directions (i.e., movement of the cable motions from left to right).

The manner in which the pen drive causes movement of the pen block 26 and therefore the pen 30 will now be explained, assuming in this instance that the carriage drive elements are stationary. For puroposes of illustration we will assume that the Y input turns shaft 64 in a clockwise direction, as viewed from the lower left-hand corner of the figure. As will be seen hereinafter, such motion will cause the pen block 26 to move generally toward the observer.

In order to simplify the explanation of how this movement is transmitted, we will first note those portions of the cable which are obviosuly stationary. Since the portion P-A is frictionally held by stationary carriage drive roller 120, not only portions A and P of the cable will be held stationary, but also obviously the immediately adjacent portions B, C and O. On first glance it would appear that portion D would also be completely stationary, but this is not true. The clockwise motion of pulley block 70 will cause pulley 78 to be driven about the axis of shaft 64 in the same clockwise circumferential direction. This will cause the loop formed by cable portions D, D-E and E to lengthen. As more and more of portion D is wrapped about the front large pulley 62, the portion E will move toward angled pulley 78. In fact, it can be shown that for every unit of revolution of pulley 78 about axis 64, portion E of the cable will move two units (relative to the fixed frame) in the direction tangential to the circumference of rear large pulley 60. At the same time more and more of the portion E-F will be wrapped about large pulley 60 as angled pulley 78 moves clockwise.

The exact motion of portions C-D, D, D-E, E, E-F and F are as follows. Revolution of angled pulley 78 about the shaft axis (64) will wind or wrap cable onto large (stationary) pulley 62, thereby lengthening portion C-D. The length of the cable stretched between large pulley 62 and angled pulley 78 (i.e., portion D) will remain the same, but portion D will change its spatial orientation, by generally revolving about the motor shaft (64) axis. At the same time, the increase in the portion (C-D) being wrapped about large pulley 62 causes the actual cable of portion (D) between pulleys 62 and 78 to be moving generally toward large pulley 62. This causes pulley 78 (and portion D-E) to rotate about the pulley axis (74). Portion E is therefore not only being pulled about small pulley 78, but is also being pulled additionally because of the revolving of pulley 78 about the axis of the motor shaft 64 (i.e., increase in the wrapped portion E-F about pulley 62). Part of the (portion E) cable movement is taken up by its being wrapped about the large pulley 60 (i.e., by lengthening of portion E-F), while the other part of the motion causes the free-wheeling large pulley (60) to rotate about shaft 64. If pulley block 70 is rotating at an angular speed, W (say, clockwise), and the first large pulley 62 is stationary (as here), then the other large pulley 60 will be rotating at an angular speed of 2W (also clockwise). This is necessary since each of the wrapped portions, C-D and E-F, are increasing by W times the (equal) circumference (C) of the large pulleys, so that twice this amount of cable (i.e., 2WC) must be supplied by rotation of pulley 60 to allow this effective lengthening of the loop (portion C-D through E-F).

Thus portions E-F and F are moving generally toward the right in the drawing. Therefore engaged portions F-G will cause the left-hand pulley 42 to rotate in the counterclockwise direction, and portion G will move to the left. Since the carriage 12 is stationary, the motion of cable portion G will cause the engaging portion G-H to rotate carriage pulley 36 in a clockwise direction, and cable portion H to move generally toward the observer. This obviously causes motion of pen block 26 in this same direction, as well as cable portion I. Therefore the rear carriage pulley 34 will be rotated in a clockwise direction (as seen from the top) and cable portion J will move away from the observer. This motion of portion J will be transmitted around already rotating front carriage pulley 36 and to cable portion K, moving to the left. Therefore pulley 48 will rotate in a counterclockwise direction, and cable portion L will move in a generally upward direction.

Portion L-M, which is wrapped to a great extent about rear large pulley 60 in the position of pulley block 70 shown, will move with pulley 60 in a clockwise direction. Therefore portion M will move in a direction more or less away from the observer, causing small angle pulley 76 to rotate in a clockwise direction. It should be noted however that angled pulley 76 is moving with pulley block 70 in a direction corresponding to a clockwise motion (about a circle of twice the size as the circumference of large pulley 60 but at half the angular speed). By converse analogy to the previously described effect of angled pulley 78, it may be seen that if angled pulley 76 is moving one unit about its large circle, then cable portion N would tend to become slack at this same unit rate. This potential slack is passed around rotative pulley 76 to cause one unit of movement of portion M (relative to pulley 76). There is no tendency for this portion M to slacken, since rear large pulley 60 has a higher angular speed than pulley block 70 (and therefore pulley 76), as previously noted. Except for the shortening of the portion (N-O) wrapped about front large pulley 62, the remaining cable portions O and P will of course be stationary. Visualized from the point of view of fixed frame 10, portion M will have two units of motion: one supplied by the one unit of motion of angled pulley 76 about shaft 64, and the other unit of motion supplied by portion M-N rotating about pulley 76 (in a clockwise direction). One unit of this combined motion of portion M-N will be compensated by the fact that the large pulley 60 is running ahead of pulley block 70 (and pulley 76). However viewed, the cable portion N-O (i.e., in contact with front large pulley 62) will have no motion. The unwrapping of portion N-O from the (N-side of) large pulley 62 will therefore cause no motion of cable portion O, pulley 50 or cable portion P. The fact that portion P-A of the cable is constrained by stationary drive roller 120 will also assist in stabilizing the large pulley 62 from undesired motion.

Thus movement of the pulley block 70 and the two angled pulleys (76, 78) rigidly mounted thereon will cause motion of the pen block 26 without changing in any way the position of the carriage 12. It necessarily follows from the fact that the pen drive and the carriage drive are completely decoupled from each other, that each may be driven so as to perform its own function without adversely affecting the other. Since it is difficult to visualize and explain compound motions caused by the simultaneous motion of the pen drive and carriage drive systems, it is merely stated that a recorder, conforming substantially exactly to the preferred embodiment illustrated, has been made and successfully tested.

Advantages of the complete decoupling of the elements controlling the carriage movement (i.e., elements 94, 100, 120, etc.) and the elements controlling the pen movement (i.e., elements 64, 80, 70, etc.) include the fact that the carriage itself may be driven in any manner (e.g., a servo system may be used to cause carriage motor 100 and its associated parts to respond to a randomly variable X input function, thereby yielding an X-Y plot of two separately variable functions). In addition, this decoupling allows the use of the device as a simple, continuous y-function plotter, where, for example, a continuous strip chart is moved under the pen and carriage (in the x-direction) by any suitable means (e.g., a separate constant speed strip chart paper drive).

Since various departures may be made from the illustrated embodiment without departing from the spirit of the invention, the invention is not limited to the details of the illustrated preferred embodiment, but rather is defined by the appended claims.

I claim:
1. An apparatus for controllably locating a movable element in a plane, comprising:
   a fixed frame;
   carriage means movably mounted on said frame for movement in a first direction;
   a movable element movably mounted on said carriage for movement in a second direction;
   a single continuous cable means comprising a first part rigidly attached at a first point to said carriage means, and a second part rigidly attached at a second point to said movable element;
   carriage drive means directly drivingly connected to said first part of said cable means for solely moving said carriage in a controllable manner relative to said fixed frame;
   element drive means, including at least one portion fixedly mounted on said fixed frame, drivingly connected to said second part of said cable means for solely moving said movable element relative to said carriage;
   and differential cable storage means interconnecting at least some portion of said first and second parts of said continuous cable means,
whereby said element drive means is effectively decoupled from movement of said carriage.
2. An apparatus according to claim 1, in which:
said movable element comprises a marker for making a visible indication on a recording medium conforming substantially to said plane,
whereby said apparatus provides a record of the various positions through which said marker element is caused to move.
3. An apparatus according to claim 1, in which:
said differential means comprises a first pulley engaging said carriage drive first cable part, a second pulley engaging said element drive second cable part, and means for differentially connecting said first and said second pulleys.
4. An apparatus according to claim 3, in which:
said differential connecting means additionally comprises at least a third pulley engaging said cable means at a third part intermediate the parts engaged by said first and second pulleys.
5. An apparatus according to claim 3, in which:
said differential connecting means additionally comprises a third and a fourth pulley;
said third and fourth pulleys being individually rotatively mounted on the same common mounting block, which in turn is mounted for rotative movement,
whereby said third and fourth pulleys are constrained to revolve together about the axis of rotation of said common mounting block.
6. An apparatus according to claim 6, in which:
said element drive means comprises means for rotating said common mounting block about said axis,
whereby the revolution of said third and fourth pulleys about said axis causes movement of at least said element drive second cable part.

References Cited

UNITED STATES PATENTS

| | | | |
|---|---|---|---|
| 2,675,291 | 4/1954 | Webster | 346—29 |
| 2,701,176 | 1/1955 | Baumgard | 346—29 |
| 2,746,151 | 5/1956 | Kennedy | 33—1 |
| 2,785,941 | 3/1957 | Macklem et al. | 346—29 X |

RICHARD B. WILKINSON, *Primary Examiner.*

JOSEPH W. HARTARY, *Assistant Examiner.*